(12) United States Patent
Pei et al.

(10) Patent No.: US 11,606,840 B2
(45) Date of Patent: Mar. 14, 2023

(54) CONNECTING ACCESS POINT TO MESH NETWORK

(71) Applicant: Hewlett Packard Enterprise Development LP, Houston, TX (US)

(72) Inventors: Junyu Pei, Beijing (CN); Xiaohang Wei, Beijing (CN); Haiming Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/811,424

(22) Filed: Mar. 6, 2020

(65) Prior Publication Data
US 2021/0282223 A1  Sep. 9, 2021

(51) Int. Cl.
| H04W 84/18 | (2009.01) |
| H04L 9/40 | (2022.01) |
| H04W 48/08 | (2009.01) |
| H04W 88/08 | (2009.01) |
| H04W 48/16 | (2009.01) |
| H04W 12/08 | (2021.01) |

(52) U.S. Cl.
CPC ............ *H04W 84/18* (2013.01); *H04L 63/08* (2013.01); *H04W 12/08* (2013.01); *H04W 48/08* (2013.01); *H04W 48/16* (2013.01); *H04W 88/08* (2013.01)

(58) Field of Classification Search
CPC ..... H04W 84/18; H04W 63/08; H04W 48/08; H04W 48/16; H04W 88/08; H04W 12/08
See application file for complete search history.

(56) References Cited

U.S. PATENT DOCUMENTS

| 2007/0250713 | A1* | 10/2007 | Rahman | H04N 21/4126 713/171 |
| 2018/0288618 | A1* | 10/2018 | Kumar | H04W 12/069 |
| 2019/0045558 | A1* | 2/2019 | Zhang | H04W 84/18 |
| 2020/0389386 | A1* | 12/2020 | Uscumlic | H04L 45/22 |

* cited by examiner

*Primary Examiner* — Wayne H Cai
(74) *Attorney, Agent, or Firm* — Hewlett Packard Enterprise Patent Department (57) ABSTRACT

In embodiments of the present disclosure, there is provided an approach for connecting an access point (AP) to a mesh network. According to embodiments of the present disclosure, an AP in a recovery mode transmits its identity information to a mesh portal (MPP) in the mesh network via an unsecured connection between the AP and the MPP. Upon a successful verification by the MP, the AP establishes a secured connection with a trusted server to obtain configuration information. The configuration information is used by the AP to establish a mesh link with an MPP or MP in the mesh network automatically. Accordingly, the AP switches from the recovery mode to a normal mode. Embodiments of the present disclosure provide an effective way for deploying and/or recovering an AP in a mesh network, which is more secure and requires no manual operation.

8 Claims, 9 Drawing Sheets

FIG. 8 ical network, as a standalone device. It is also possible to implement an AP as an integral component of the wireless router or the wireless switch. In operation, an AP provides wireless connections to other devices using wireless Local Area Network (WLAN) technology, for example.

CONNECTING ACCESS POINT TO MESH NETWORK

BACKGROUND

An access point (AP) is a networking device that allows wireless devices such as Wi-Fi devices to connect to a network such as Wide Area Network (WAN). Usually the AP may connect to a router or a switch, via a wired or wireless network, as a standalone device. It is also possible to implement an AP as an integral component of the wireless router or the wireless switch. In operation, an AP provides wireless connections to other devices using wireless Local Area Network (WLAN) technology, for example.

Generally, the WLANs can be classified as a wireless single-hop network and a wireless multi-hop network. In a wireless single-hop network, each AP is wired to the network, and the user devices directly connect to the wired AP. In a wireless multi-hop network, such as a mesh network, one or more APs are wired to the network, while the other APs are connected to those wired APs, so that user devices can connect to the wired AP through the intermediate or relaying APs.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

A mesh network is a communication network comprising radio nodes such as APs in mesh topology. An AP joining a mesh network usually acts as a mesh portal point (MPP) or a mesh point (MP). An MPP is a gateway which connects the mesh network and an external network, such as, WAN. In the mesh network, the MPP communicates with MPs and enables these MPs to communicate with the external network. An MP is a node which supports wireless communication and mesh functions, such as, automatic topology discovery, automatic route discovery, and data packet forwarding. In order to deploy an AP into a mesh network, it is usually required to define a role of the AP in the mesh network and provide the AP with a configuration for establishing a mesh link with other AP(s) in the mesh network based on the role of the AP.

Traditionally, two steps are required to deploy an AP into a mesh network. The AP first connects to a controller or server via a wired connection to predefine its role in the mesh network and obtain a configuration. Then a user manually installs the AP in a production environment by strictly following the role of the AP predefined via the controller or server. If an AP in a mesh network loses its mesh link and cannot rejoin the mesh network, the user has to manually uninstall the AP from the production environment, recover the AP and then reinstall the AP back to the production environment. The deployment and recovery of the AP are time-consuming and labor-intensive.

Embodiments of the present disclosure propose a way of deploying and/or recovering an AP for a mesh network, which requires no manual operation and is more secure than the traditional ways. Through the following descriptions of some example embodiments, it will be appreciated that embodiments of the present disclosure do not require connecting every AP to a controller or server via a wired connection for deployment or recovery. As a result, the deployment and/or recovery of an AP for a mesh network is more effective and efficient than the traditional ways.

In some embodiments, if no mesh link between an AP and a mesh network detected within a predetermined period of time, the AP may enter into a recovery mode accordingly. Alternatively, in some embodiments, if an AP loses its mesh link and tries to recover the mesh link for a predetermined number of times but fails, the AP may also enter into a recovery mode accordingly. The recovery mode is a special mode for an AP, which can facilitate the AP to establish a mesh link with a mesh network automatically.

In some embodiments, an AP in the recovery mode may establish an unsecured connection with an MPP based on a specific credential. The AP may transmit its identity information to the MPP via the unsecured connection for verification. Upon a successful verification by the MP, the AP may establish a secured connection with a trusted server (e.g., on cloud) to obtain configuration information. The configuration information may be used by the AP to establish a mesh link with an MPP or MP in the mesh network automatically. Accordingly, the AP switches from the recovery mode to a normal mode.

In this way, an AP with a factory setting can join a mesh network automatically after obtaining its configuration from a trusted server via a secured link. Moreover, a failed MP in the mesh network can recovery its mesh link automatically, thereby reducing the maintenance cost for the mesh network.

Other advantages of embodiments of the present disclosure will be described with reference to the example implementation as described below. Reference is made below to FIG. 1 through FIG. 8 to illustrate basic principles and several example embodiments of the present disclosure herein. Although embodiments of the present disclosure are described with reference to a mesh network, it is to be understood that any other wireless network having similar topology, either currently known or to be developed in future, may be used in combination with the embodiments of the present disclosure. The scope of the present disclosure is not limited in this aspect.

Figure 1:
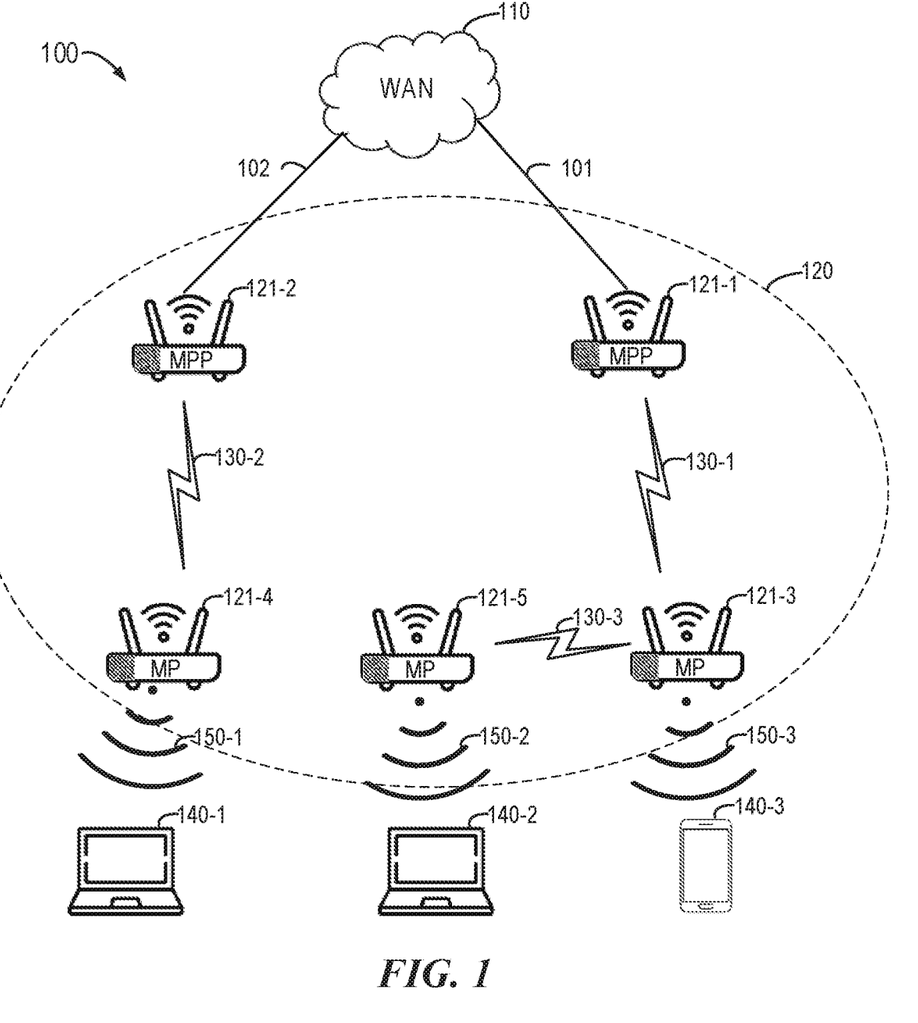
FIG. 1 illustrates an example environment in which embodiments of the present disclosure can be implemented.

FIG. 1 illustrates an example environment 100 in which embodiments of the present disclosure can be implemented. As shown in FIG. 1, the environment 100 comprises a WAN 110, a mesh network 120 and user devices 140-1, 140-2 and 140-3 (collectively referred to as 140).

The WAN 110 may be a network that spans regions, countries, or even the world. The WAN is generally used to connect LANs and other types of networks together to enable communications among different devices. Examples of the WAN include, but are not limited to, the Internet.

The mesh network 120 is wired to the WAN 110 through cables 101 and 102, for example. The mesh network 120 comprises a plurality of APs 121 acting as their respective roles. For example, the APs 121 in the mesh network 120 include MPPs 121-1, 121-2 and MPs 121-3, 121-4, 121-5 (collectively referred to as "AP 121").

An MPP is the gateway between the wireless mesh network and the wired LAN or WAN such as the Internet. An MPP uses its wired or wireless interface (such as an Ethernet port, 4G-modem) to establish a link to the wired LAN or WAN. In some cases, multiple MPPs are deployed in one mesh work to support redundant mesh paths from the wireless mesh network to the wired LAN or WAN.

An MP is configured to establish an all-wireless path to the MPP and to provide some WLAN services to the user devices or clients. The WLAN services comprise, but are not limited to, client connectivity, intrusion detection system (IDS) capabilities, user role association, LAN-to-LAN bridging, and Quality of Service (QoS) for LAN-to-mesh communication. In addition, the MP may also perform mesh backhaul and/or network connectivity.

As shown in FIG. 1, the MPPs 121-1 and 121-2 are wired to the WAN 110, while the MPs 121-3, 121-4 and 121-5 are connected wirelessly. The MPPs 121-1 and 121-2 are gateways between the wireless mesh network 120 and the WAN 110, while the MPs 121-3, 121-4 and 121-5 provide WLAN connectivity service for the user devices 140. In some embodiments, the mesh network 120 may be wired to another LAN.

The APs 121 are connected together via wireless mesh links to form the mesh network 120 based on their configurations. A configuration of an AP may comprise one or more parameters for establishing a mesh link with its neighbor, which include, but are not limited to, a network name, a network identifier (such as, Service Set Identifier, SSID), a network key. The configurations of these APs may indicate a same identifier such as a SSID specific to the mesh network (can be referred to as "mesh ID"). The MPP 121-1 may broadcast the mesh ID, and the MPs 121-2, 121-3 and 121-4 may then connect to the MPP 121-1 based on the mesh ID.

A mesh link 130-1 is established between the MPP 121-1 and the MP 121-3 and a mesh link 130-2 is established between the MPP 121-2 and the MP 121-4. In this way, the MPs 121-3, 121-4 can join the mesh network 120. The MPs 121-3, 121-4 as well as the MPPs 121-1 and 121-2, may broadcast the mesh ID of the mesh network 120. Then, depending on the path selection protocol and the path selection metric, the MP 121-5 may connect to the nearby MP 121-3 so as to establish a mesh link 130-3 between the MP 121-3 and the MP 121-5.

The MPs 121-3, 121-4 and 121-5 may provide the wireless connectivity services in their respective coverage areas. For example, the MP 121-4 provides the wireless connectivity service via a wireless access link 150-1 to a user device 140-1 such as a laptop, the MP 121-5 provides the wireless connectivity service via a wireless access link 150-2 to a user device 140-2 such as a laptop, and the MP 121-3 provides the wireless connectivity service via a wireless access link 150-3 to a user device 140-3 such as a mobile device. It is to be understood that the mesh network 120 may have more MPPs and/or may have more or less MPs. In addition, each MP may provide wireless connectivity service to two or more user devices.

In some embodiments, the MPP, MP and/or any other devices in the example environment 100 may each include, but are not limited to, a processor or processing unit, a memory, a storage device, a communication unit. The processor or processing unit may perform various processes based on the programs or instructions stored in the memory. The storage device may include machine-readable media, which may be used for storing information and/or data. The communication unit may include one or more antennas for conducting wireless communications with other devices.

Figure 2A:
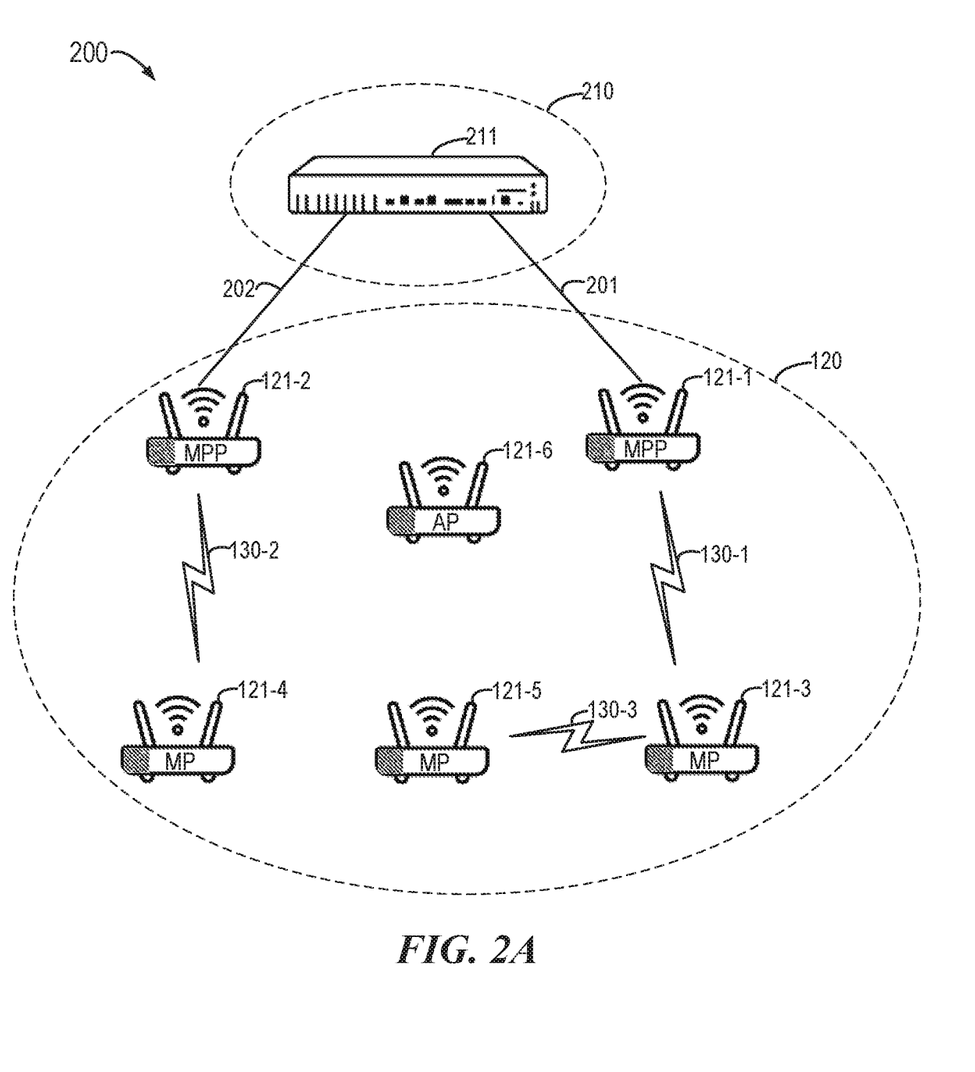
FIG. 2A illustrates an example environment for deploying an AP in a mesh network according to embodiments of the present disclosure.
Figure 2B:
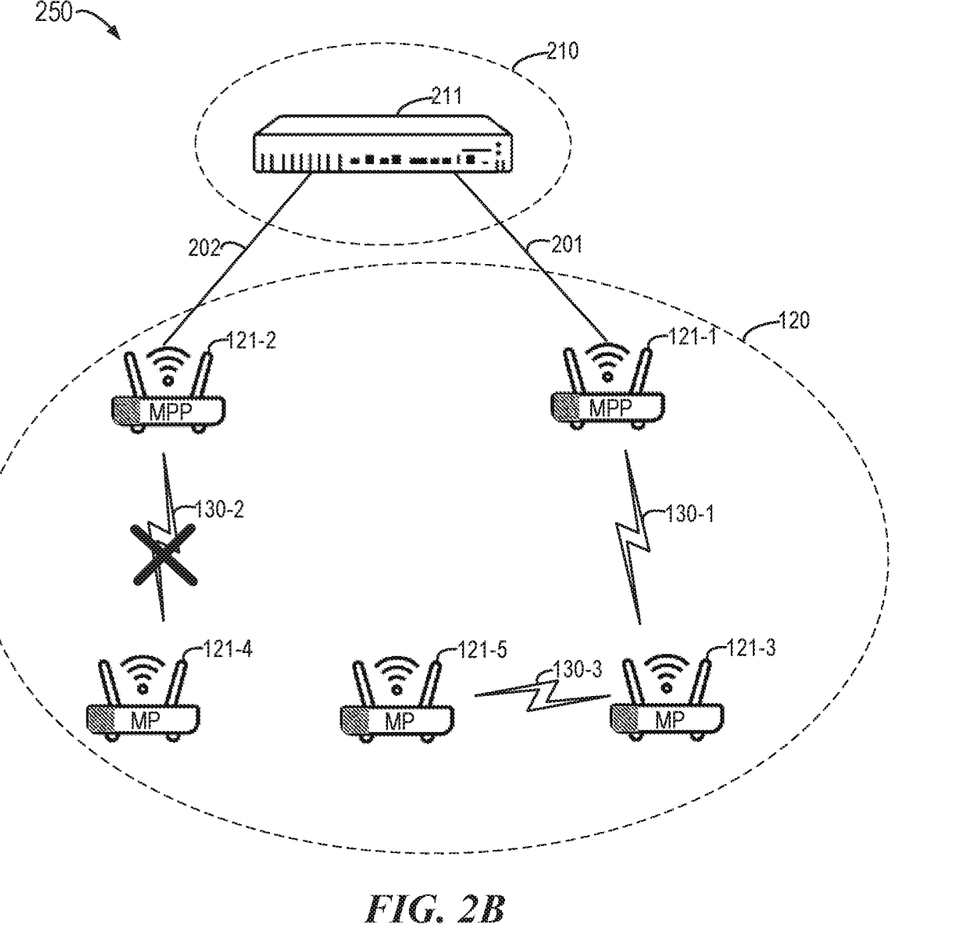
FIG. 2B illustrates an example environment for recovering a failed AP in a mesh network according to embodiments of the present disclosure.

FIG. 2A illustrates an example environment 200 for deploying an AP in the mesh network 120 according to embodiments of the present disclosure. FIG. 2B illustrates another example environment 250 for recovering a failed AP in the mesh network 120 according to embodiments of the present disclosure.

Compared with FIG. 1, a server 211 is introduced in the environments 200 and 250 for authenticating and managing APs in the mesh network 120. For example, the MPP 121-1 is connected to the server 211 via a wired or wireless connection 201 and the MPP 121-2 is connected to the server 211 via a wired or wireless connection 202. Although the MPPs 121-1 and 121-2 are shown as connected to the same server 211 in FIGS. 2A and 2B, it is to understand that this is merely for the purpose of simplification, without suggesting any limitation to the scope of the present disclosure. In some embodiments, for example, the MPPs 121-1 and 121-2 may connect to different servers. It is also to be understood that the server 211 as shown is merely a logic entity that manages the mesh network 120. In some embodiments, the server 211 may be implemented in a plurality of physical devices, which may have different locations. In FIGS. 2A and 2B, for example, the server 211 is shown as a cloud server, which is located on cloud 210. Only for the purpose of simplification, the WAN 110 as well as the cables 101 and 102 are omitted in FIGS. 2A and 2B.

In the environment 200 as shown in FIG. 2A, a new AP 120-6 with a factory setting is to join the mesh network 120. Once the new AP 120-6 is ordered by a user, the user needs to register identity information (for example, an identifier, a serial number or so on) of the AP 120-6 with the server 211. Then the new AP 120-6 can be deployed in the mesh network 120 without any wired setup or intervention from the user. If no active mesh link between the AP 120-6 and the mesh network 120 is detected within a predetermined period of time, the AP 120-6 may enter into a recovery mode. The recovery mode is a special mode for an AP, which can facilitate the AP to establish a mesh link with a node in the mesh network 120 automatically and thereby join the mesh network 120, as will be further described in the following.

In the environment 250 as shown in FIG. 2B, at some point, the mesh link 130-2 may fail. For example, the MP 121-4 may lose its mesh link 130-2 due to software bugs, incorrect configuration, losing its configuration, frequent power outages or the like. Therefore, the MP 121-4 disconnects from the mesh network 120 and becomes an orphan point. In some embodiments, if the MP 121-4 loses its mesh link, it may try to reboot itself and reconnect to the MPP 121-2 for several times. If the MP 121-4 successfully reconnects to the MPP 121-2, it can return to the mesh network 120. Otherwise, the MP 121-4 may also enter into the recovery mode. As mentioned above and will be further described in the following, the recovery mode can facilitate the MP 121-4 to reestablish a mesh link with a node in the mesh network 120 automatically and thereby rejoin the mesh network 120.

In some embodiments, an AP (for example, the AP 121-6 or the MP 1214) in the recovery mode may be enabled to establish an unsecured connection with any MPP (for example, the MPP 121-1 or 121-2) from a same vendor based on a specific credential. For example, the specific credential may be pre-configured to APs from the same vendor via the factory setting. An MPP from the same vendor may allow an unsecured connection to be established with an AP with such specific credential, if the recovery function of the MPP is enabled. An AP without such specific credential will be denied by the MPP.

In some embodiments, if the unsecured connection with the MPP is established, the AP may transmit its identity information to the MPP via the unsecured connection for verification. In some embodiments, the MPP may accept, via the unsecured connection, traffic directed to limited destinations and/or following other restrictions. The other restrictions on the traffic may include, but not limited to restrictions on the time, amount, protocols, source, packet size and/or other attributes of the traffic. As such, an attacker can hardly get in touch with the MPP by simulating the recovery mechanism. In some embodiments, the recovery function of the MPP can be disabled if needed, so as to further ensure the security.

In some embodiments, the MPP may verify the identity information of the AP by itself if it has an authentication capability. Alternatively, or in addition, the MPP may forward the identity information of the AP to a server (for example, the server 211), with which the AP has been registered, for verification.

In some embodiments, if it is verified that the identity information of the AP is valid, the MPP may send an acknowledgement (ACK) to the AP, such that the AP is enabled or triggered to establish a secured connection with a server via the MPP and obtain configuration information from the server. For example, the AP may establish a Transport Layer Security (TLS) connection with the server via the MPP. The MPP may act as a proxy to forward traffic between the AP and the server. The configuration information may be transmitted over the TLS connection based on a communication protocol (for example, WebSocket). As such, an attacker can hardly intercept or decrypt the configuration information.

In some embodiments, if the MPP verifies that the identity information of the AP is invalid, it may disconnect from the AP. As such, an illegal AP can be prevented from getting in touch with the server, thereby ensuring the security of the whole deployment or recovery process. Once the configuration information is obtained from the server, the AP can establish a mesh link with an MP or MPP in the mesh network based on the configuration information and thereby join the mesh network.

Figure 3:
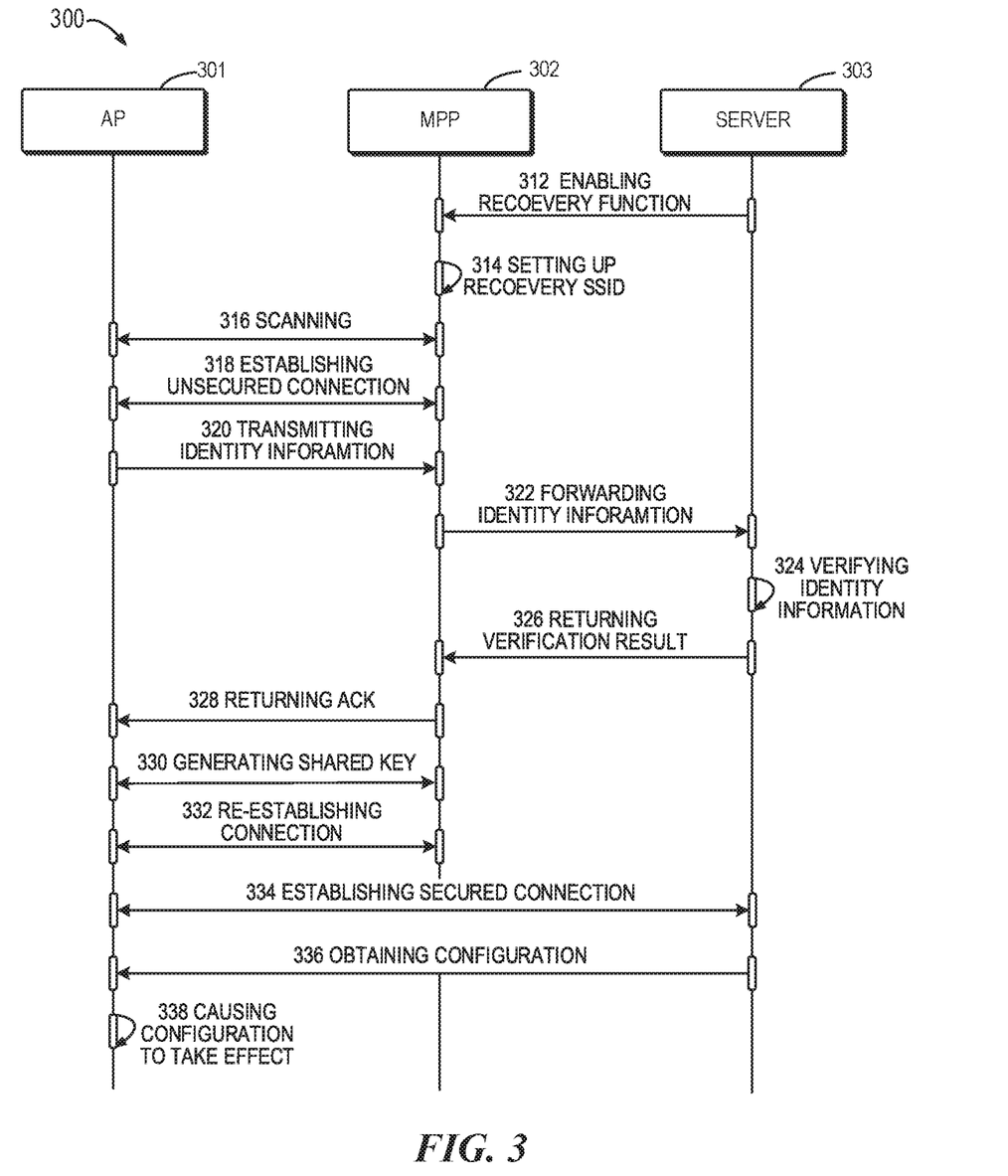
FIG. 3 illustrates a signaling chart of an example process for connecting an AP in a recovery mode to a mesh network according to embodiments of the present disclosure.

FIG. 3 illustrates a signaling chart of an example process 300 for connecting an AP in the recovery mode to a mesh network according to embodiments of the present disclosure. In this process 300, an AP 301, an MPP 302 and a server 303 are involved. In some embodiments, the AP 301 may be implemented as any AP 121 shown in FIGS. 1-2B, which is in the recovery mode, for example, the AP 121-6 in FIG. 2A or the MP 121-4 in FIG. 2B. The MPP 302 may be implemented as the MPP 121-1 or 121-2 as shown in FIGS. 1-2B. The server 303 may be implemented as the server 211 in FIGS. 2A-2B.

As shown in FIG. 3, the server 303 sends (312) a command to the MPP 302 for enabling its recovery function. Once the recovery function is enabled, the MPP 302 sets up (314) a network identifier (such as, a recovery SSID) specific to AP(s) in the recovery mode. For example, the MPP 302 may broadcast the recovery SSID to enable AP(s) in the recovery mode to discover the MPP 302 based on the recovery SSID. The AP 301 in the recovery mode scans (316) MPPs in proximity of the AP 301 based on the recovery SSID and discovers the MPP 302. For example, the AP 301 in the recovery mode may scan MPPs within its radio coverage.

The AP 301 establishes (318) an unsecured connection with the MPP 302 based on a specific credential. For example, the specific credential may be a temporary token shared by the AP 301 and the MPP 302. Once the unsecured connection is established, the AP 301 transmits (320) its identity information to the MPP 302. For example, if the MPP 302 has a capability of verifying the identity information, it may verify whether the AP 301 is valid or not by itself. Otherwise, as shown in FIG. 3, the MPP 302 forwards (322) the identity information of the AP 301 to the server 303 for verification. Since the identity information of the AP 301 has been registered with the server 303, the server 303 may verify (324) the identity information of the AP 301, for example, by checking its database.

The server 303 returns (326) a verification result to the MPP 302, which indicates the identity information of the AP 301 is valid or not. If the verification result indicates that the identity information of the AP 301 is valid, as shown in FIG. 3, the MPP 302 returns (328) an ACK to the AP 301. Alternatively, if the verification result indicates that the identity information of the AP 301 is invalid, the MPP 302 may disconnect from the AP 301.

Once the ACK is received from the MPP 302, the AP 301 can establish a secured connection with the server 303 via the MPP 302. As shown in FIG. 3, the AP 301 and the MPP 302 each generate (330) a shared key that is shared between them. For example, the shared key may be generated based on a public key of the AP 301. Alternatively, or in addition, the shared key may be temporary. The AP 301 re-establishes (332) a new connection with the MPP 302 based on the shared key. Such reconnection based on the new credential can further improve security of the whole deployment or recovery process. Then the AP 301 establishes (334) the secured connection with the server 303 based on the new connection between the AP 301 and the MPP 302 as well as an original connection between the MPP 302 and the server 303. For example, the AP 301 may establish a TLS connection with the server 303 and the MPP 302 may act as a proxy to forward traffic between the AP 301 and the server 303.

Once the secured connection between the AP 301 and the server 303 is established, the AP 301 obtains (336) configuration information from the server 303. For example, the configuration information may comprise one or more parameters for establishing a mesh link in the mesh network, which include, but are not limited to, a name of the mesh network, an identifier (such as, SSID) of the mesh network, a network key, a role of the AP 301 in the mesh network, and so on.

As shown in FIG. 3, the AP 301 causes (338) the configuration information to take effect. For example, if the configuration information indicates that the AP 301 is to act as an MPP in the mesh network, the AP 301 may broadcast the identifier of the mesh network and establish a mesh link with an MP in the mesh network based on the identifier of the mesh network and the network key. Alternatively, if the configuration information indicates that the AP 301 is to act as an MP in the mesh network, the AP 301 may establish a mesh link with an MPP or another MP which broadcasts the identifier of the mesh network based on the network key. For example, the AP 301 may reboot to cause the configuration information to take effect. Accordingly, the AP 301 switches from the recovery mode to a normal mode and successfully joins the mesh network.

Alternatively, if the AP 301 fails to establish the secured connection with the server 303 or fails to obtain the configuration information from the server 303 for any reason, the AP 301 may disconnect from the MPP 302 and go back to scan and connect to a different MPP.

Figure 4:
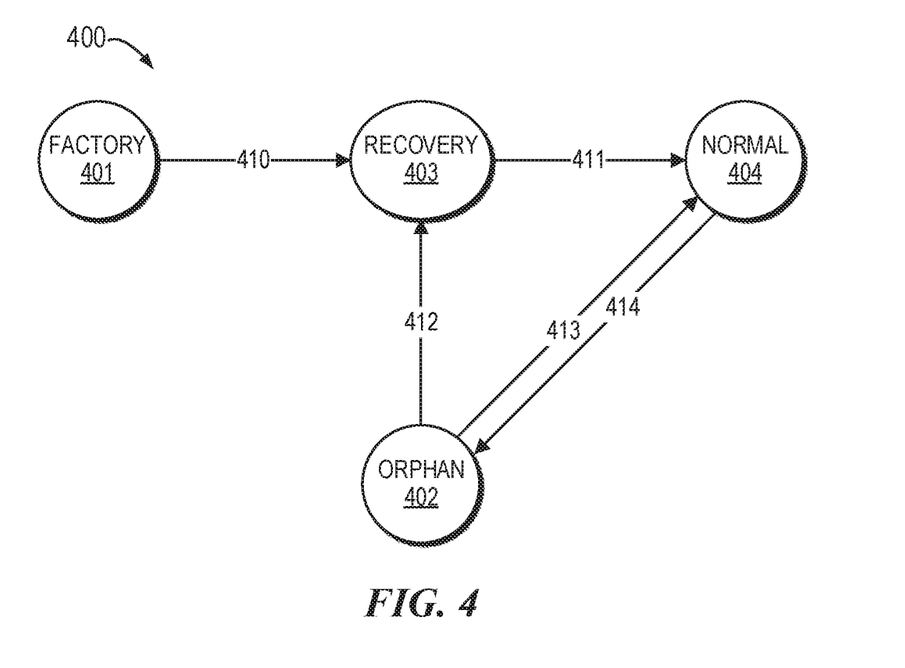
FIG. 4 illustrates an example state machine of an AP according to embodiments of the present disclosure.

FIG. 4 illustrates an example state machine 400 of an AP according to embodiments of the present disclosure. For example, the state machine 400 can be implemented at any AP 121 shown in FIGS. 1-2B or the AP 301 shown in FIG. 3.

As shown in FIG. 4, an AP with a factory setting is in a factory mode 401 initially. If no active mesh link associated with the AP is detected within a predetermined period of time, the AP will switch 410 from the factory mode 401 to a recovery mode 402. As described above, the AP in the recovery mode 402 may connect to a surrounding MPP based on a specific credential and get in touch with a server for obtaining a configuration. If the AP successfully obtains the configuration and establishes an active mesh link accordingly, the AP will switch 411 from the recovery mode 403 to the normal mode 404. If the AP in the normal mode 404 loses its mesh link, the AP will switch 414 from the normal mode 404 to an orphan mode 402. The AP in the orphan mode 402 may try to reboot itself and recover the mesh link for several times. If the AP successfully recovers its mesh link, the AP will switch 413 from the orphan mode 402 to the normal mode 404. If the AP fails to recover its mesh link, the AP will switch 412 from the orphan mode 402 to the recovery mode 403.

Figure 5:
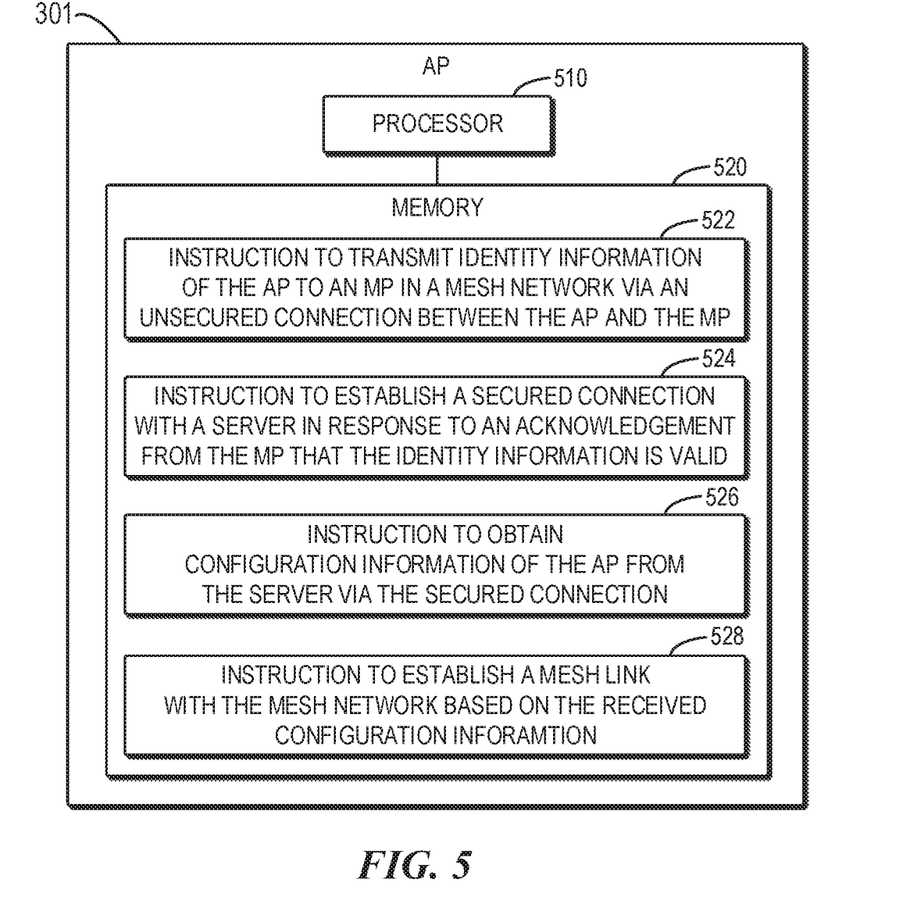
FIG. 5 illustrates an example AP according to embodiments of the present disclosure.

FIG. 5 illustrates an example AP 301 according to embodiments of the present disclosure. The AP 301 comprises a processor 510 and a memory 520 coupled to the processor 510. The memory 520 stores instructions 522, 524, 526 and 528 to cause the processor 510 to perform some acts.

As shown in FIG. 5, the memory 520 stores instruction 522 to transmit identity information of the AP 301 to an MP in a mesh network via an unsecured connection between the AP 301 and the MP in accordance with a determination that the AP 301 is unconnected to the mesh network.

In some embodiments, the AP 301 may detect if there is an active mesh link between the AP 301 and the mesh network. If no active mesh link between the AP 301 and the mesh network is detected within a predetermined period of time, it may be determined that the AP 301 is unconnected to the mesh network. The AP 301 may enter into a recovery mode accordingly. Alternatively, in some embodiments, if the AP 301 loses its mesh link, the AP 301 may become an orphan point and initiate a recovery of its mesh link. If the AP 301 tries to recover the mesh link for a predetermined number of times but fails, it may be determined that the AP 301 is unconnected to the mesh network. The AP 301 may enter into the recovery mode accordingly. As such, an AP with a factory setting or an orphan point in the mesh network can automatically enter into the recovery mode, in which the AP will be facilitated to establish a mesh link automatically.

In some embodiments, the AP 301 in the recovery mode may scan MPPs in proximity of the AP 301 and determine the MPP to connect to. For example, the AP 301 may scan MPPs within its radio coverage. The AP 301 in the recovery mode may establish an unsecured connection with the discovered MPP based on a specific credential for transmission of the identity information. For example, the MPP may allow an unsecured connection to be established with an AP with such specific credential, if the recovery function of the MPP is enabled. Further, the MPP may accept, via the unsecured connection, traffic directed to limited destinations and/or following other restrictions, such as, restrictions on the time, amount, protocols, source, packet size and/or other attributes of the traffic. As such, an attacker can hardly get in touch with the MPP by simulating the recovery mechanism.

As shown in FIG. 5, the memory 520 stores instruction 524 to establish a secured connection with a server in response to an ACK from the MPP that the identity information is valid.

In some embodiments, if the AP 301 receives the ACK from the MPP, the AP 301 may establish the secured connection with the server via the MPP. For example, the AP 301 and the MPP may generate a shared key and reestablish a connection between each other based on the shared key. Such reconnection based on the new credential can further improve security of the whole deployment or recovery process. Then the AP 301 may establish the secured connection with the server based on the reestablished connection with the MPP and an original connection between the MPP and the server. For example, the AP 301 may establish a Transport Layer Security (TLS) connection with the server via the MPP. As such, the MPP can act as a proxy to forward traffic between the AP 301 and the server.

As shown in FIG. 5, the memory 520 stores instruction 526 to obtain configuration information of the AP 301 from the server via the secured connection. For example, the configuration information may be obtained over the TLS connection between the AP 301 and the server based on a communication protocol (for example, WebSocket). As such, an attacker can hardly intercept or decrypt the configuration information.

As shown in FIG. 5, the memory 520 stores instruction 528 to establish a mesh link with the mesh network based on the configuration information. For example, the configuration information may comprise one or more parameters for establishing the mesh link, which include, but are not limited to, a name of the mesh network, an identifier (such as, SSID) of the mesh network, a network key, a role of the AP 301 in the mesh network, and so on. If the configuration information indicates that the AP 301 is to act as an MPP in the mesh network, the AP 301 may broadcast the identifier of the mesh network and establish a mesh link with an MP in the mesh network based on the identifier of the mesh network and the network key. Alternatively, if the configuration information indicates that the AP 301 is to act as an MP in the mesh network, the AP 301 may establish a mesh link with an MPP or another MP which broadcasts the identifier of the mesh network based on the network key. Accordingly, the AP 301 can switch from the recovery mode to a normal mode and successfully join the mesh network.

In this way, embodiments of the present disclosure provide a way of deploying and/or recovering an AP for a mesh network, which requires no manual operation and is more secure than the traditional ways. Since no wired setup is needed any more, the deployment and/or recovery of an AP for a mesh network are effective and efficient, thereby reducing the maintenance cost for the mesh network.

Figure 6:
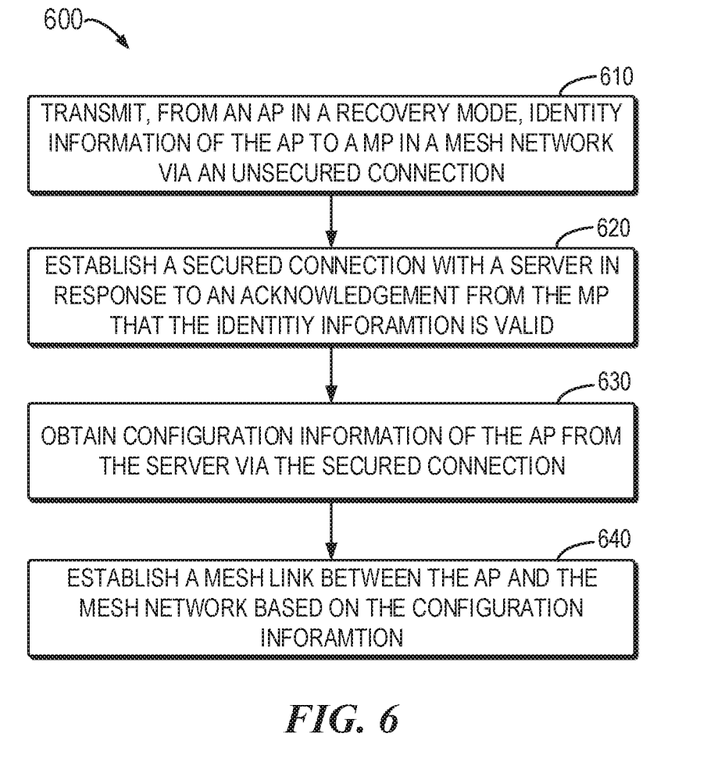
FIG. 6 illustrates a flow chart of an example method for connecting an AP to a mesh network according to embodiments of the present disclosure.

FIG. 6 illustrates a flow chart of an example method 600 for connecting an AP to a mesh network according to embodiments of the present disclosure. It is to be understood that the method 600 may be executed by any AP 121 or the AP 301 as described with reference to FIGS. 1-5.

At 610, an AP in a recovery mode transmits identity information of the AP to a MPP in a mesh network via an unsecured connection between the AP and the MPP. At 620, the AP establishes a secured connection with a server in response to an ACK from the MPP that the identity information is valid. At block 630, the AP obtains configuration information of the AP from the server via the secured connection. At block 640, the AP establishes a mesh link with the mesh network based on the configuration information. In this way, the AP can be deployed into a mesh network efficiently and securely, without any wired setup or intervention from the user. Moreover, a failed MP in the mesh network can recovery its mesh link automatically, thereby reducing the maintenance cost for the mesh network.

Figure 7:
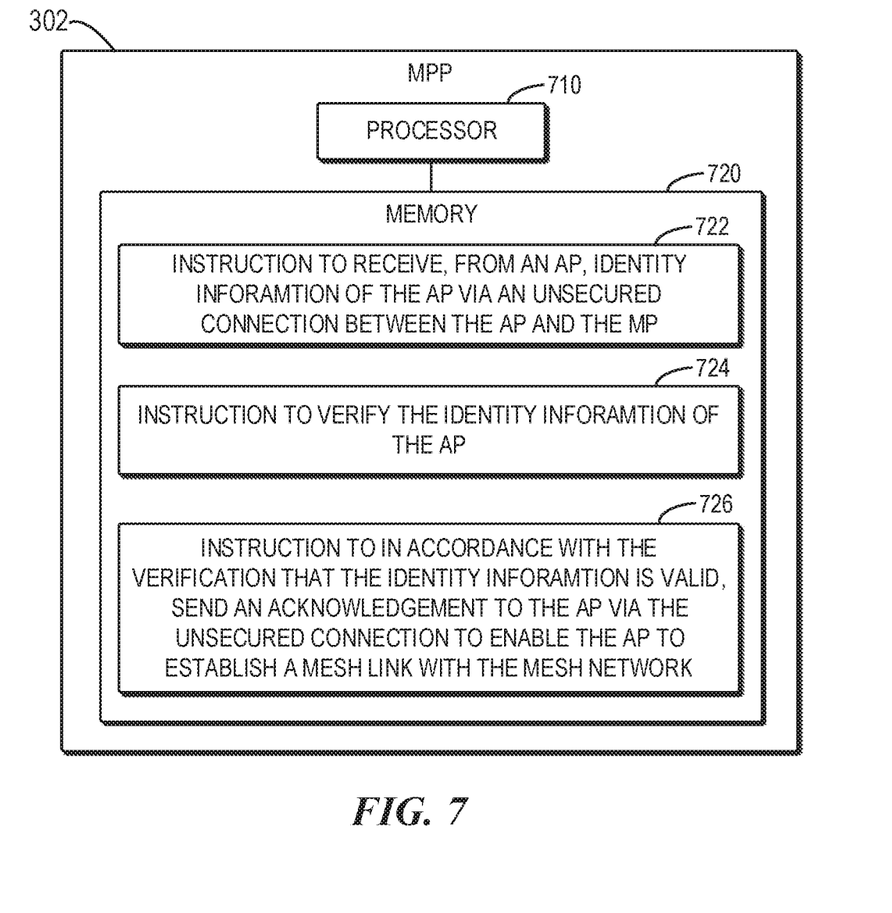
FIG. 7 illustrates an example mesh portal according to embodiments of the present disclosure.

FIG. 7 illustrates an example MPP 302 according to embodiments of the present disclosure. The electronic device 302 comprises a processor 710 and a memory 720 coupled to the processor 710. The memory 720 stores instructions 722, 724 and 726 to cause the processor 710 to perform some acts.

As shown in FIG. 7, the memory 720 stores instruction 722 to receive, from an AP, identity information of the AP via an unsecured connection between the AP and the MPP 302. For example, prior to receiving the identity information of the AP, the MPP 302 may establish the unsecured connection with the AP based on a specific credential shared between the AP and the MPP 302. The MPP 302 may allow an unsecured connection to be established with an AP with such specific credential, if the recovery function of the MPP is enabled. Further, the MPP 302 may accept, via the unsecured connection, traffic directed to limited destinations and/or following other restrictions, such as, restrictions on the time, amount, protocols, source, packet size and/or other attributes of the traffic. As such, an attacker can hardly get in touch with the MPP 302 by simulating the recovery mechanism.

As shown in FIG. 7, the memory 720 stores instruction 724 to verifying the identify information of the AP. For example, if the MPP 302 has a capability of verifying the identity information, it may verify the identify information of the AP by itself. Otherwise, if the AP has registered with a server, the MPP 302 may forward the identity information of the AP to the server for verification. For example, the server may verify the identity information of the AP for example, by checking its database.

As shown in FIG. 7, the memory 720 stores instruction 726 to send an acknowledgement to the AP via the unsecured connection if the identity information is verified as valid, so as to enable the AP to establish a mesh link with the mesh network. For example, if the identification information is verified as invalid, the MPP 302 may disconnect from the AP. As such, an illegal AP can be prevented from getting in touch with the server, thereby ensuring the security of the whole deployment or recovery process.

In some embodiments, the MPP 302 may further cause the AP to establish a secured connection with a server via the MPP 302 for transmission of configuration information of the AP. For example, the AP and the MPP may generate a shared key and reestablish a second connection between each other based on the shared key. Such reconnection based on the new credential can further improve security of the whole deployment or recovery process. Then the MPP 302 may facilitate the AP to establish the secured connection with the server based on the reestablished connection between the AP and the MPP 302 as well as an original connection between the MPP 302 and the server. For example, the MPP 302 may facilitate the AP to establish a Transport Layer Security (TLS) connection with the server via the MPP 302. As such, the MPP 302 may act as a proxy to forward traffic between the AP and the server.

In this way, embodiments of the present disclosure provide away of deploying and/or recovering an AP for a mesh network, which requires no manual operation and is more secure than the traditional ways. Since no wired setup is needed any more, the deployment and/or recovery of an AP for a mesh network are effective and efficient, thereby reducing the maintenance cost for the mesh network.

Figure 8:
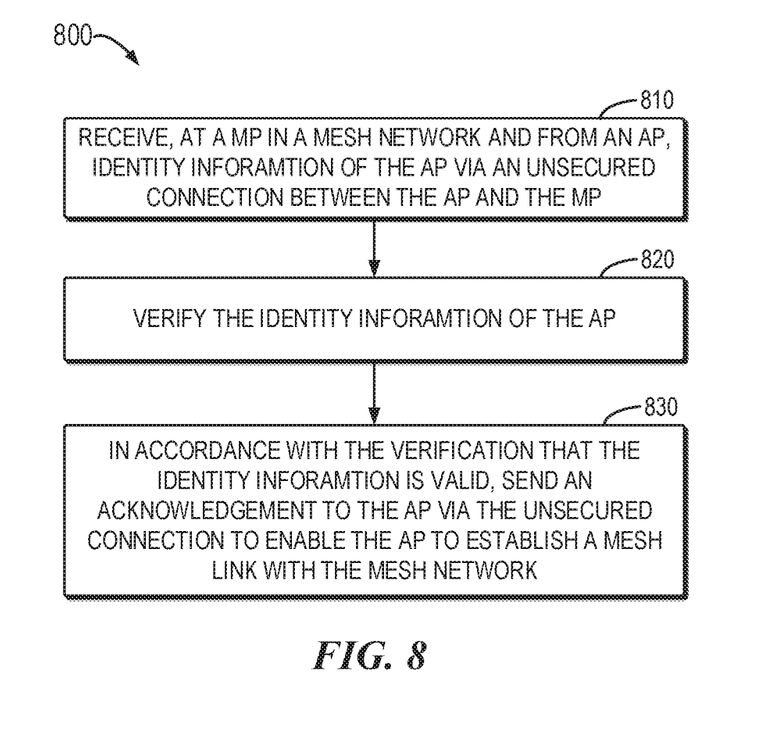
FIG. 8 illustrates a flow chart of an example method for connecting an AP to a mesh network according to embodiments of the present disclosure.

FIG. 8 illustrates a flow chart of an example method 800 for connecting an AP to a mesh network according to embodiments of the present disclosure. It is to be understood that the method 800 may be executed by any AP 121 acting as an MPP or the MPP 302 as described with reference to FIGS. 1-7.

At 810, an MPP receives, from an AP, information of the AP via an unsecured connection between the AP and the MPP. At 820, the MPP verifies the identity information of the AP. At 830, in accordance with the verification that the identity information is valid, the MPP sends an ACK to the AP via the unsecured connection to enable the AP to establish a mesh link with the mesh network. In this way, the AP can be deployed into a mesh network efficiently and securely, without any wired setup or intervention from the user. Moreover, a failed MP in the mesh network can recovery its mesh link automatically, thereby reducing the maintenance cost for the mesh network.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. An access point comprising:
   a processor; and
   a memory coupled to the processor, the memory storing instructions to cause the processor to perform acts comprising:
      in accordance with a determination that the access point is unconnected to a mesh network, establishing an unsecured connection with a first mesh portal in the mesh network based on a specific credential of the access point and the first mesh portal;
      transmitting identity information of the access point to the first mesh portal in the mesh network via the unsecured connection between the access point and the first mesh portal;
      in response to an acknowledgement from the first mesh portal that the identity information is valid, establishing a secured connection with a server via the first mesh portal by generating a shared key between the access point and the first mesh portal, reestablishing a connection with the first mesh portal based on the shared key, and establishing the secured connection with the server based on the reestablished connection with the first mesh portal and a connection between the first mesh portal and the server, wherein the identity information is verified based on registration of the access point in the server;
      obtaining configuration information of the access point from the server via the secured connection;
      determining, from the configuration information, a role of the access point indicative of whether the access point acts as a second mesh portal or a mesh point in the mesh network; and
      establishing a mesh link with the mesh network based on the role of the access point.

2. The access point according to claim 1, wherein the acts further comprise:
   scanning a plurality of mesh portals in proximity of the access point to determine the first mesh portal.

3. The access point according to claim 1, wherein the determination that the access point is unconnected to a mesh network is made by:
   detecting a mesh link between the access point and the mesh network; and
   in accordance with a determination that no mesh link between the access point and the mesh network is detected within a predetermined period of time, determining that the access point is unconnected to the mesh network.

4. The access point according to claim 1, wherein the determination that the access point is unconnected to a mesh network is made by:
   in accordance with a determination that the access point loses an original mesh link with the mesh network, initiating a recovery of the original mesh link;
   in response to a failure of the recovery of the original mesh link, determining that the access point is unconnected to the mesh network.

5. A method comprising:
   establishing, by an access point in a recovery mode, an unsecured connection with a first mesh portal in a mesh network based on a specific credential of the access point and the first mesh portal;
   transmitting, from the access point in the recovery mode, identity information of the access point to the first mesh portal in the mesh network via the unsecured connection between the access point and the first mesh portal;
   in response to an acknowledgement from the first mesh portal that the identity information is valid, establishing a secured connection with a server via the first mesh portal by generating a shared key between the access point and the first mesh portal, reestablishing a connection with the first mesh portal based on the shared key, and establishing the secured connection with the server based on the reestablished connection with the first mesh portal and a connection between the first mesh portal and the server, wherein the identity information is verified based on registration of the access point in the server;
   obtaining, from the server via the secured connection, configuration information of the access point;
   determining, from the configuration information, a role of the access point indicative of whether the access point acts as a second mesh portal or a mesh point in the mesh network; and
   establishing the mesh link between the access point and the mesh network based on the role of the access point.

6. The method according to claim 5, further comprising:
   scanning a plurality of mesh portals in proximity of the access point to determine the first mesh portal.

7. The method according to claim 5, further comprising:
   detecting a mesh link between the access point and the mesh network; and
   in accordance with a determination that no mesh link between the access point and the mesh network is detected within a predetermined period of time, causing the access point to enter into the recovery mode.

8. The method according to claim 5, further comprising:
   in accordance with a determination that the access point loses an original mesh link with the mesh network, initiating a recovery of the original mesh link;
   in response to a failure of the recovery of the original mesh link, causing the access point to enter into the recovery mode.

* * * * *